United States Patent [19]  
Moteki

[11] Patent Number: 4,967,292  
[45] Date of Patent: Oct. 30, 1990

[54] HEAD POSITION CONTROLLER FOR A DISC STORAGE UNIT

[75] Inventor: Eiji Moteki, Kawasaki, Japan

[73] Assignee: Fuji Electric Company, Ltd., Kanagawa, Japan

[21] Appl. No.: 69,439

[22] Filed: Jul. 2, 1987

[30] Foreign Application Priority Data

Jul. 8, 1986 [JP] Japan ................ 61-160420

[51] Int. Cl.⁵ .................. G11B 5/55; G11B 5/596
[52] U.S. Cl. .................... 360/78.13; 360/61; 360/77.05; 360/77.08; 360/75
[58] Field of Search ............ 360/77, 78, 98, 61–63, 360/75, 98.01, 98.02, 77.01–77.11, 78.01, 78.04–78.15

[56] References Cited

U.S. PATENT DOCUMENTS

| 4,396,956 | 8/1983 | Hedlund. | |
|---|---|---|---|
| 4,598,327 | 7/1986 | Jen et al. | 360/77 |
| 4,638,384 | 1/1987 | Stewart et al. | 360/77 |
| 4,639,863 | 1/1987 | Harrison et al. | 360/98.01 |
| 4,669,004 | 5/1987 | Moon et al. | 360/77 |
| 4,783,705 | 11/1988 | Moon et al. | 360/77.08 |

FOREIGN PATENT DOCUMENTS

| 55-150161 | 11/1980 | Japan | 360/77 |
|---|---|---|---|
| 60-193176 | 10/1985 | Japan | 360/77 |
| 61-59674 | 3/1986 | Japan | 360/77 |
| 61-271675 | 12/1986 | Japan | 360/77.08 |
| 62-117173 | 5/1987 | Japan | 360/77 |

OTHER PUBLICATIONS

IBM TDB, vol. 24, No. 7A, "Servo Concept for Buried Servo Without Use of Dual Gap Heads", Lissner et al., Dec., 1981, pp. 3181–3182.  
IBM Technical Disclosure Bulletin, vol. 29, No. 5, Oct., 1986, pp. 2304–2305.

Primary Examiner—Vincent P. Canney  
Assistant Examiner—Steven R. Garland  
Attorney, Agent, or Firm—Spencer & Frank

[57] ABSTRACT

A head position controller for a disc storage unit comprises a plurality of disc surfaces, and a plurality of read/write heads corresponding to the disc surfaces. Servo information is written into at least two disc surfaces. This controller comprises a selector for selecting one read/write head which can read the servo information written on a disc surface which is the closest to a read/write head to be selected as a head for reading out/writing recording information in accordance with specific bits in a head selection command, a detector for detecting an off-track amount in accordance with the readout servo information, and a circuit for correcting a position of read/write heads in accordance with the detected off-track amount.

1 Claim, 2 Drawing Sheets

HEAD POSITION CONTROLLER FOR A DISC STORAGE UNIT

BACKGROUND OF THE INVENTION

1. Field of the Invention

The present invention relates to a head position correcting system for a disc storage unit such as a fixed disc unit and more particularly to a system for correcting a position of a head in the disc storage unit by closed-loop control in response to an off-track amount detected from servo information read out in a so-called data-surface-servo system in which recording information and so-called servo information are stored on a surface of a disc.

2. Description of the Prior Art

In a recently developed disc storage unit, not only reduction in diameter of the disc but also an increase in data storage capacity has been demanded, and therefore efforts have been made in the prior art to increase storage density on the surface of a disc. Recently, one major surface of a small disc about 3.5 inches in diameter has hundreds of information recording tracks, so that only the use of only a conventional open-loop control system has become not sufficient in order to control a transducer head or read/write head for writing and reading out data into and from a track, so that the head is positioned precisely to a desired track. Therefore, it has become necessary to employ a closed loop control system. That is, reference information or so-called servo information is previously written in the surface of a disc and this servo information is read out by the read/write head to detect a deviation of a position of the head from its proper position or a so-called off-track amount, so that the position of the head is corrected by the closed-loop control system in such a way that the detected off-track amount is within a predetermined allowance range. In the head position correcting systems of the type described above, use is made of a surface servo system in which all of one major surface of a disc is exclusively used to store the servo information. But, in this system, a precious area for recording general information on the surface of the disc is exclusively used for the storage of the servo information. As a result, the demand for increasing the storage density cannot be met. Therefore, recently, a data-surface-servo system in which the servo information is stored only in a limited area of the surface of the disc upon which general information is stored has been mainly used.

Since a precise control of a position of the head is based upon the servo information, in either of the control systems described above, a position at which the servo information is stored must be determined accurately on the surface of the disc Therefore, in the case of writing the servo information, a writing unit exclusively designed and constructed to write the servo information has been used. In this writing unit, the position of the head is accurately measured by, for instance, a laser beam or the like and after the head has been correctly located at a predetermined position, the servo information is recorded Of course, the recording of the servo information is accomplished after a plurality of discs are assembled in the disc storage unit. In this case, a head position can be accurately measured for a specific disc surface, for instance, a surface of the outermost disc of the stack of a plurality of discs, but an accurate measurement of a head position is not easy for a surface of the remaining discs between the outermost discs. The recording of the servo information by the exclusive write unit has a high accuracy, but the detection and control of a position of the head in relation to each track requires some time, so that it takes a substantial time for writing the servo information into hundreds of tracks on the surface of the disc.

Therefore, in a conventional mass-produced disc storage unit such as a fixed disc unit, the servo information is written only in one disc surface of a plurality of disc surfaces in the disc storage unit. Of course, mechanical positions of the respective heads in relation to a plurality of disc surfaces are not uniform in a strict sense. However, the setting of recording information tracks on the surfaces of all the discs and the tracking of the heads for reading or writing data are accomplished based on this single servo information, since it has been considered that it is not needed to write the servo information in all the disc surfaces.

In principle, there is no reason for limiting the servo information to the above-described single servo information, but practical experience of running the disc storage unit so far has shown the fact that there occurs a failure in writing or reading required data which is considered to be caused by an error in a head position. The result of the analysis of such a failure shows that the reading or writing failure hardly occurs in case of the surface of the disc on which the servo information is recorded, and that it frequently happens that a reading or writing failure occurs in the case of a surface of a disc on which the servo information is not recorded.

It is, therefore, considered that the reading or writing failure is mainly caused by mechanical problems, and more particularly that an inclination of a shaft of a spinning motor for rotating a disc and an inclination of a carriage for carrying and guiding the head in a direction of the movement of the carriage are delicately varied due to variations in ambient temperature or operation temperature or mechanical errors caused by the use of the disc unit for a long period of time. In the case of a fixed disc unit, such errors become several micrometers at the maximum when a track pitch is of the order of 30 $\mu$m. Thus, it is understood that the errors become almost equal to a so-called gap portion which separates adjacent tracks from each other.

SUMMARY OF THE INVENTION

In view of the above, it is an object of the present invention to provide a head position correcting system for a disc storage unit in which, even if there occurs an error in a head position, a failure or error of reading or writing data from or into a surface of a disc due to the head position error is prevented.

In the present invention, servo information is written into a surface of a disc on which recording information is stored and in response to a head selection command one of the heads, each of which is disposed in opposed relationship with each of the major surfaces of the discs, is selected so that data is read out from that head. In response to the servo information read out by the selected head, an off-track amount of the head from its normal position with respect to a track on the surface of the disc is detected. In response to the off-track amount thus detected, the position of the head with respect to the normal track position is corrected. The servo information is written into a plurality of surfaces of all the surfaces of the discs, and in response to the head selection command, the head for reading out the servo information is selected in order to detect an off-track amount of the head for reading or writing.

In the system in accordance with the present invention, the servo information is written into all of a plurality of disc surfaces or into a part of the plurality of disc surfaces. Prior to reading or writing information from or into a surface of a disc by a desired head, the servo information is read out by that desired head itself or by another head which most typically represents that desired head, so that in response to an off-track amount detected in accordance with the servo information thus read out by the head, a position of the head for reading or writing is controlled and corrected precisely. Therefore, even if unpredictable mechanical errors such as an inclination of the shaft of the disc rotating motor or an inclination of the carriage occurs during the use of the disc storage unit, recording information can be read out or written into the disc while the head is always maintained at a normal position along a track independently of such an error or by effectively correcting such an error in a position of the head Thus, highly reliable and dependable operation of the disc storage unit is ensured.

In the first aspect of the present invention, there is provided a head position correcting system for a disc storage unit having a plurality of disc surfaces of a plurality of discs on which tracks for recording information are provided, a plurality of read/write heads each of which is disposed corresponding to each of the disc surfaces to read or write the recording information from or into the corresponding disc surface, and means for generating a head selection command for selecting one of the plurality of read/write heads to read or write the recording information. The system comprises:

servo information arranged on a plurality of disc surfaces which are selected at least partially from the plurality of disc surfaces;

selection means for selecting one of a plurality of read/write heads corresponding to a plurality of disc surfaces on which the servo information is arranged in accordance with the head selection command;

detection means for detecting an off-track amount of the selected read/write head with respect to a normal position of one of the tracks in accordance with an output read out from the selected read/write head; and correcting means for correcting a position of the read/write heads in accordance with the detected off-track amount.

Here, the servo information may be stored on all the disc surfaces and in accordance with the head selection command a read/write head to be selected as a head for reading or writing the recording information may be selected as the servo information read head.

The servo information may be stored on a plurality of disc surfaces selected partially from all of the plurality of disc surfaces and in accordance with the head selection command a read/write head which can read the servo information written on a disc surface which is the closest to a read/write head to be selected as a head for reading or writing the recording information can be selected as the servo information read head.

The head selection command may be a command signal consisting of a plurality of bits and the command signal may have a predetermined arrangement of bits which select the servo information read head.

The servo information may be embedded servo information embedded in the disc surface in such a way that the servo information is aligned in the same circumferential direction of the discs, and the system may further comprise:

means for generating a mask signal for masking the servo information;

means for inhibiting reading or writing of the recording information in response to the mask signal while the servo information is being read out; and means for switching an access of the read/write head to one of the disc surfaces from the servo information read head to one of the read/write heads after the disappearance of the mask signal upon completion of the reading of the servo information.

The correcting means may include a stepping motor with a plurality of phases and the servo information may be written while the stepping motor is maintained at a reference position on an electric angle diagram of the stepping motor.

In the second aspect of the present invention, the system comprises:

servo information arranged on a plurality of disc surfaces which are selected at least partially from the plurality of disc surfaces;

selection means for selecting one of the read/write heads in accordance with the head selection command, the read/write heads being allotted to at least one group in which one of the allotted read/write heads is predetermined, the selected read/write head serving as a servo information read head for reading out the servo information when correcting positions of the allotted read/write heads in one group;

detection means for detecting a off-track amount of the selected read/write head with respect to a normal position of one of the tracks in accordance with an output read out from the selected read/write head; and correcting means for correcting a position of the read/write heads in one group in accordance with the detected off-track amount.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
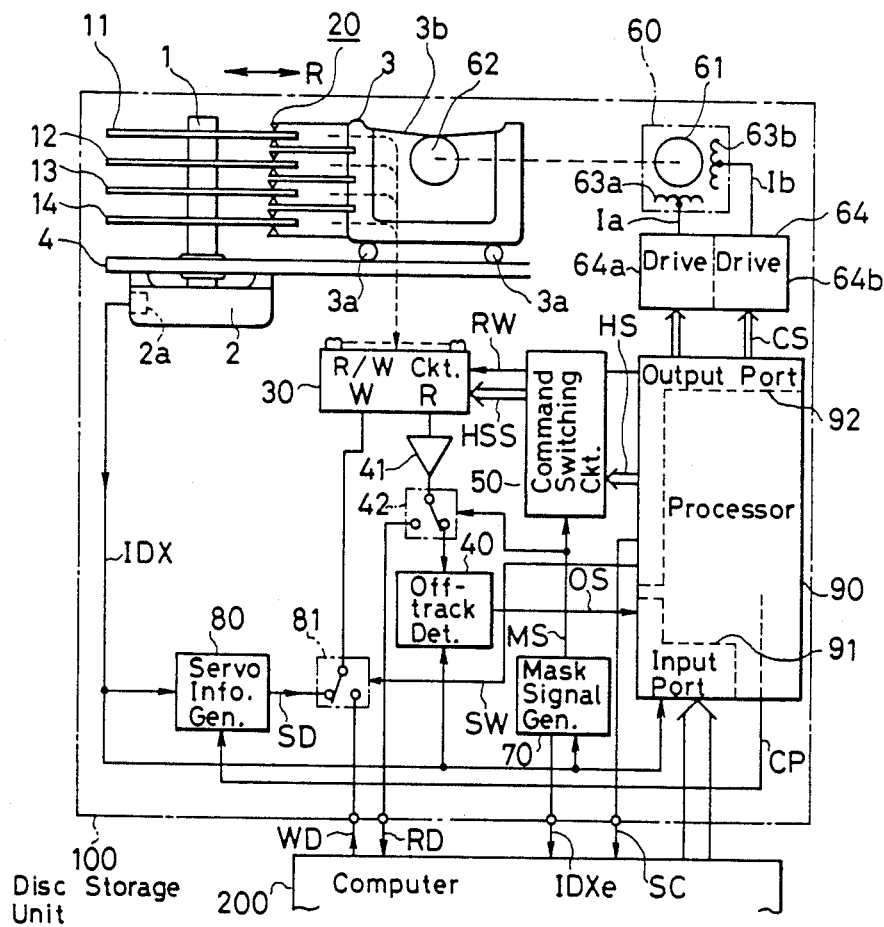
FIG. 1 is a block diagram showing one embodiment of the present invention.

FIG. 1 shows an embodiment of an interior construction of a disc storage unit 100 adapted to carry out a control system in accordance with the present invention together with an embodiment of a computer 200 which is schematically illustrated as a user of the disc storage unit 100. It is to be understood that for the sake of simplicity in explanation various means in the disc storage unit 100 are shown in the form of hardware, but in practice some or most of them may be arranged in the form of software.

A mechanism of an essential portion of the unit 100 is schematically shown in the upper left portion of the disc storage unit 100 enclosed by dash-and-dotted lines. In this embodiment, the disc storage unit 100 illustrated is a fixed disc unit having four discs 11-14 which are securely carried by a common spindle shaft 1 and are driven at a predetermined high rotating speed by a spindle motor 2.

Figure 2:
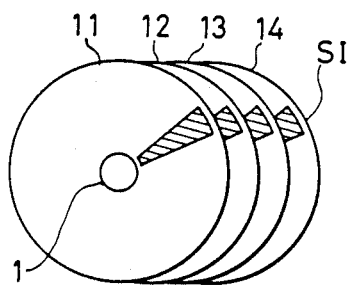
FIG. 2 is a schematic view illustrating storage regions of discs on which servo information is stored in an embodiment of the present invention.

As shown in FIG. 2, servo information SI is stored in a circumferential portion of one or both of the major surfaces of the respective discs 11-14 in such a way that the servo information storage regions interrupt the circumference of the surface and are aligned with each other in the same circumferential direction.

Figure 3:
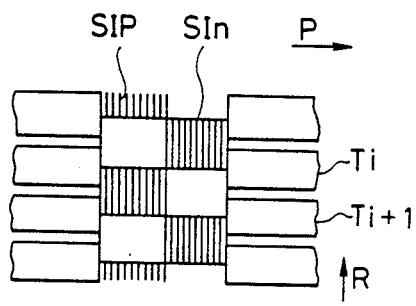
FIG. 3 is an explanatory diagram used to explain a relationship between positions of the servo information written into the disc shown in FIG. 2 and its tracks.

While in the embodiment of the present invention, contents of the servo information SI may be arbitrarily selected, an advantageous example of the storage region is shown in a developed form in FIG. 3. In the example shown in FIG. 3, each servo information SI is divided into two portions SIp and SIn, each of which has about one hundred simple magnetic patterns repeated in the circumferential direction P. The magnetic patterns are written in the storage portions SIp and SIn which are adjacent to each other in the radial direction R and staggered from each other in the circumferential direction P. The tracks Ti and Ti+1 (where i is a variable) are arranged between the storage portions SIp and SIn in such a way that the center line or normal position of each of the tracks Ti are aligned with each other. In case of detecting an off-track amount of a head 20 with respect to the track Ti, the head 20 reads out the servo information from both the portions SIp and SIn and then, for instance, the levels of the signals read out from the head are compared to detect an off-track amount.

As shown in FIG. 1, eight read/write heads 20 for writing or reading the servo information SI and recording information are disposed corresponding to the respective major surfaces of the discs 11-14 and are carried commonly by a carriage 3. The carriage 3 is guided movably in the radial direction R of the disc through guide members such as balls 3a on a base plate 4. Furthermore, the carriage 3 is securely mechanically joined through, for instance, a thin metal band 3b to a capstan 62 directly coupled to a rotor 61 of a stepping motor 60 shown on the right side in FIG. 1, so that the heads 20 are displaced in the radial direction of the discs 11-14 in response to a clockwise or counterclockwise rotation of the stepping motor 60 to be positioned at a desired track.

A read/write circuit 30 shown in FIG. 1 may be a conventional circuit such as a "6-channel read/write IC", HA 16652MP, a product of Hitachi Ltd , which, in response to a head selection command HS or HSS, connects the output terminal of the selected head to a read-output terminal R or a write-input terminal W which is selected by the read/write command RW. The read out signal such as servo information SI derived from the read output terminal R is applied through a demodulator or amplifier 41 to a switch circuit 42. In case that the servo information SI is read out, the movable contact of the switch 42 is maintained in the position as shown in FIG. 1, so that the readout signal is applied to an off-track detector 40 which may be of a conventional type such as a comparator adapted to the format of the servo information SI The off-track detector 40 detects an off-track amount OS from the readout signal and applies the detected off-track amount OS through an input port 91 to a processor 90 such as an 8 bit microcomputer 8051, manufactured by Intel Corp. and incorporated into the disc storage unit 100.

On the other hand, the write-input terminal W of the read/write circuit 30 receives through another switching circuit 81 write data WD from the computer 200 or servo data SD from a servo information generator 80. Only in the case of writing the servo information SI into the discs 11-14, the switching circuit 81 receives a servo information write command SW from an output port 92 of the processor 90, the switching circuit 81 is maintained at the position shown in FIG. 1.

The spindle motor 2 incorporates a pulse generator 2a which generates one conventional index pulse IDX in synchronism with a rotation of the discs; usually one pulse per one rotation. The index pulse IDX is supplied to the amplifier 41 or the servo information generator 80 as a sync signal. A mask signal generator 70 shown at the lower right portion of the off-track detector 40 may be composed of, for instance, a flip-flop and a timer and, in response to the index pulse IDX, generates a mask signal MS during a short period of time succeeding the index pulse IDX and also generates an external index pulse IDXe, which is supplied to the computer 200 after the lapse of a short period of time. Essentially, the mask signal MS serves to mask the servo information SI stored on the surface of the disc to prevent the servo information SI from being erroneously erased. In this embodiment, the mask signal MS is applied to the switching circuit 42, so that the readout signal from the head 20 is supplied to the off-track detector 40 within the above-described short period of time. Thus, the mask signal MS serves to instruct the off-track detector 40 to detect an off-track amount.

On the other hand, only after the reception of the exterior index pulse IDXe, the computer 200 accesses the discs 11-14 in order to read or write recording information. Therefore, the computer 200 cannot read or write the servo information SI from or into the disc storage unit 100 and even cannot recognize the presence of the servo information SI. In view of the above, the system for reading or writing the servo information in this embodiment is referred to as "an embedded servo system" as described above.

In response to the off-track amount OS detected by the off-track detector 40, the processor 90 generates a control signal CS which is applied to the stepping motor 60 so as to control and correct a position of the head 20 The control signal CS is received by a drive circuit 64 of the stepping motor 60. The stepping motor 60 shown in FIG. 1 is a two-phase type stepping motor and the drive circuit 64 controls directions and values of phase currents Ia and Ib flowing through two phase coils 63a and 63b of the stepping motor 60, respectively, so that a rotor 61 of the stepping motor 60 is brought to and maintained at a desired angular position. The drive circuit 64 has two halves 64a and 64b assigned to the phases a and b, respectively, which are adapted to receive the control signal CS independently of each other. Both halves 64a and 64b may be composed of conventional circuits and can be, in the simplest construction, switching circuits for reversing the directions of the flows of the phase currents Ia and Ib. Furthermore, from the standpoint of the correction control, each of the halves 64a and 64b may be a circuit which, for instance, accomplishes PWM (pulse width modulation) control of the phase current in order to determine the phase current at a value designated by the control signal CS. It is preferable that each control signal CS consists of a plurality of bits for determining a direction and a value of the phase current, as is well known in the art.

So far, the arrangements of various circuits shown in FIG. 1 have been described and next operations of the system in accordance with the present invention will be described. First, the writing of the servo information for controlling and correcting the position of the head 20 will be described. In this case, the processor 90 delivers the control signal CS to the drive circuit 64, so that the stepping motor 60 is located at one of the reference positions on the electric angle diagram as shown in FIG. 5.

Figure 5:
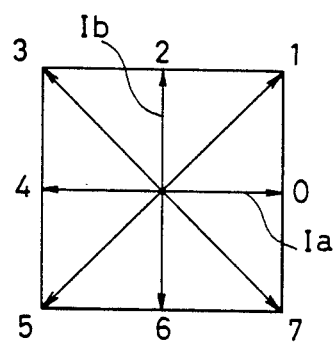
FIG. 5 is an explanatory diagram used to explain an electrical angle of the stepping motor shown in FIG. 1.

In FIG. 5, eight vector positions defined by the two phase currents Ia and Ib are indicated by 0-7, respectively. For instance, the above-described reference positions are odd-numbered vector positions 1, 3, 5 and 7 which correspond to the vector positions at which two positive or negative phase currents co-exist. On the other hand, the even-numbered vector positions 0, 2, 4 and 6 correspond to the positions of the tracks on the surface of the disc. The mechanical position of the head 20 is maintained most stably at one of the reference positions at which the two phase currents co-exist, and this depends on improved reproducibility of the position of the stepping motor 60; that is, the stationary position of the head 20 at the time of writing the servo information SI can be improved by sequentially applying the control signals CS to the drive circuit 64 in such a way that the stepping motor 60 reaches a desired reference position from the clockwise direction or the counterclockwise direction depending on the existing vector position.

In case of reading or writing recording information from or into the surface of the disc, the stepping motor 60 is located at an even-numbered vector position between two adjacent reference positions. In this case, the position of the stepping motor 60 is controlled and corrected based upon the servo information SI written at the position of the disc corresponding to the reference position of the stepping motor 60. As a result, the problem of the mechanical accuracy at the position of the head 20 can be eliminated. After the head has been brought to a position for writing the servo information which corresponds to one of the reference positions of the stepping motor 60 by rotating the stepping motor 60 in a predetermined direction of depending upon the existing vector position rotation, the servo information write command SW is delivered from the processor 90 to the switching circuit 81. Then, the switching circuit 81 is maintained in the state as shown in FIG. 1, so that the servo data SD delivered from the servo information generator 80 is supplied to the write input terminal W of the read/write circuit 30 to write the servo data SD on the surface of the disc. The servo information generator 80 may be a conventional pattern generator, and as described above, the servo information SD may be in the form of repetition of simple patterns such as simple ON-OFF signals. In the embodiment as shown in FIG. 1, it is sufficient that the servo information SD is generated in synchronism with the index pulse IDX or the mask signal MS for a short period of time in response to the clock pulses delivered from the processor 90. It is of course apparent that in order to write more complicated servo information, the servo data SD can be produced by the computer 200 or the processor 90 instead of the generator 80.

Next, the operation of writing or reading recording information into or from the surface of the disc will be explained. The processor 90 receives from the computer 200 addresses such as a disc surface number, a track number of a track on the surface of the selected disc and a sector number, which are required for writing or reading recording information into or from the surface of the disc. The processor 90 delivers the read/write command RW and the head selection command HS corresponding to such addresses as described above to the command switching circuit 50 shown in FIG. 1. The command switching circuit 50 also receives the above-described mask signal MS and switches the received commands in accordance with the mask signal MS.

Figure 4:
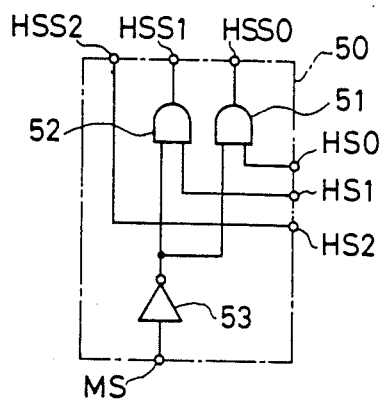
FIG. 4 is a circuit diagram showing an embodiment of the command switching circuit shown in FIG. 1.

FIG. 4 shows one embodiment of the command switching circuit 50 associated with the head selection command. While, a portion associated with the read/write command RW in the command switching circuit 50 is not shown in FIG. 4 for the sake of simplicity, the command switching circuit 50 normally maintains the read/write command RW in the read command mode as long as the mask signal MS exists.

Figure 6:
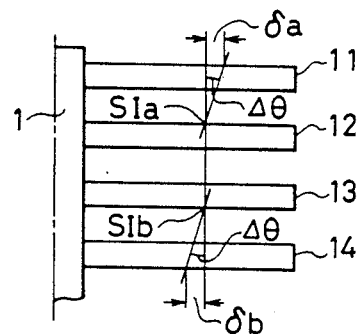
FIG. 6 is a side view showing discs illustrating an off-track amount in the embodiment of the present invention.

The command switching circuit 50 shown in FIG. 4 is used only when two servo data SIa and SIb are written on the upper surface of the disc 12 and on the lower surface of the disc 13 in the eight major surfaces of the four discs 11-14, as shown in FIG. 6. Such servo information storage mode corresponds to the mode in which the above-described servo information SI is written on a plurality of surfaces of the discs selected from all the major surfaces of the discs. In order to select one of the eight heads 20, in this embodiment, the head selection command HS consists of three-bit commands HS0-HS2.

Furthermore, in this embodiment, the selection of one of the eight heads in response to the head selection commands HS0-HS2 serves to simplify the construction of the command switching circuit 50. For instance, head number "0" is assigned to the head 20 in opposing relationship with the upper major surface of the disc 12 and head numbers "1", "2" and "3" are assigned to the heads 20 in opposing relationship with the other surfaces of the upper two discs 11 and 12. Head number "4" is assigned to the head in opposing relationship with the lower surface of the disc 13, and head numbers "5"-"7" are assigned to the heads 20 in opposing relationship with the three remaining major surfaces of the discs 13 and 14.

As is apparent from FIG. 4, when the mask signal MS does not exit, that is, when the mask signal MS is in the "LOW" state, two AND gates 51 and 52 are enabled through an inverter 53, so that the head selection commands HS0-HS2 per se are outputted as converted head selection signals HSS0-HSS2. On the other hand, when the mask signal MS exists and is in the "HIGH" state, the AND gates 51 and 52 are disabled, so that the converted head selection commands HSS0 and HSS1 are all "0", while the head selection command HS2 per se is outputted as the converted head selection command HSS2.

The head selection commands HSi and the converted head selection commands HSSi have weighting factors "1", "2" and "4" depending upon their suffix i (i=0, 1, 2). It follows, therefore, that when the head selection commands HS0–HS2 have the values 0–3, the converted head selection commands HSS0–HSS2 always have the value "0", so that the head 20 for reading out the servo information SIa on the upper surface of the disc 12 is selected. When the head selection commands HS0–HS2 have the values "4"–"7", the converted head selection commands HSS0–HSS2 always have the value 4, so that the head 20 for reading out the servo information SIb stored on the lower surface of the disc 13 is selected. That is, in the case of reading or writing recording information from or into the surfaces of the upper two discs 11 and 12, prior to the writing or reading the information, the command switching circuit 50 delivers the command to the read/write circuit 30 to select the head 20 corresponding to the upper surface of the disc 12 as the head for reading out the servo information on the upper surface of the disc 12 while the mask signal MS exists. In the case of reading or writing recording information from or into the surfaces of the lower two discs 13 and 14, the command switching circuit 50 delivers the command to the read/write circuit 30 to select the head 20 corresponding to the lower surface of the disc 13 as the head for reading out the servo information on the lower surface of the disc 13.

The processor 90 repeatedly delivers the control signals CS to the drive circuit 64 simultaneously with the output of the read/write command RW or the head selection command HS so that the head 20 is positioned to the vicinity of a desired track in a so-called seek mode. In this seek mode, as is well known to those skilled in the art, the stepping motor 60 is controlled by the open-loop control system and when the head is positioned to the vicinity of the desired track, the stepping motor 60 is controlled by the closed-loop control system.

During the closed-loop control period, the servo information is read out while the mask signal MS exists. As is apparent from the above description, the servo information SI is always read out by the head selected by the converted head selection command HSS, regardless of the state of the read/write command RW. The signal thus read out by the selected head is delivered as the servo information to the off-track detector 40.

In response to an off-track amount OS detected by the off-track detector 40, the processor 90 controls and corrects the position of the head through the drive circuit 64 and the stepping motor 60 so as to eliminate the off-track amount OS as is well known in the art. When the processor 90 detects that the off-track amount OS becomes within an allowance range after one or more correction controls, the seek mode is completed. Consequently, the processor 90 delivers the seek-mode-completion signal SC to the computer 200, so that the reading or writing of recording information is enabled.

Thereafter, in synchronism with the above-described exterior index pulse IDXe, the computer 200 executes the reading or writing mode.

In this embodiment, the off-track detector 40 on the side of the disc storage unit 100 generates an off-track amount OS every single rotation of the disc, so that except for a writing time or a reading time of the computer 200, the position of the head 20 can be controlled and corrected continuously in response to the read out servo information SI while the mask signal MS exists, so that the head 20 can be always maintained at its normal position. Of course, it is not necessarily required to continue such correction control operation even after the completion of the seek mode. Even if the control signal CS obtained when the seek mode is completed is maintained, the stepping motor 60 can be maintained at that position when the seek mode is completed.

Figure 7:
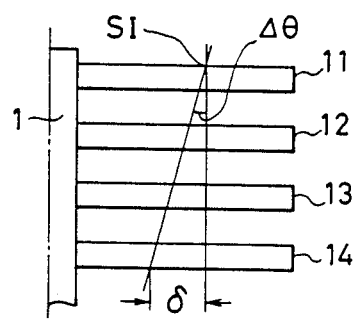
FIG. 7 is a side view showing discs illustrating an off-track amount in a conventional disc storage unit.

So far the embodiment of the present invention which is considered to be most advantageous for carrying out the present invention has been described, but it is to be understood that various variations and modifications within the scope of the present invention can be embodied. For instance, the off-track detector 40, the command switching circuit 50, the mask signal generator 70 and the servo information generator 80 can be partially or fully replaced by software incorporated in the processor 90. Furthermore, when the servo information is written on all the surfaces of the discs 11–14 in the disc storage unit 100, the operation of converting the head selection command by the command switching circuit 50 in response to the head selection commands HS is not needed. If the head selection command HS per se is supplied to the read/write circuit 30, a head 20 which is the same as the head for writing or reading recording information into or from the surface of the disc can be selected as a head for reading out the servo information in response to the head selection command HS FIG. 6 explains advantageous effects of the present invention in case of the above-described embodiment where two servo data are written in the manner described above in comparison with the conventional head position control system shown in FIG. 7. In the case of the conventional control system, as shown in FIG. 7, in which a single servo data SI is written on the upper surface of the uppermost disc 11, the maximum off-track amount $\delta$ results, when the spindle shaft 1 is inclined by $\Delta\theta$, but in the case of the control system in accordance with the present invention, as shown in FIG. 6, the positions of the heads 20 for the upper two discs 11 and 12 are controlled and corrected in response to the upper servo information SIa, while the heads 20 for the lower two discs 13 and 14 are controlled and corrected in response to the lower servo information SIb, so that the maximum off-track amounts are only $\delta a$ and $\delta b$, as shown in FIG. 6. Thus, it is apparent that according to the present invention, an off-track amount can be considerably reduced as compared with the off-track amount $\delta$ resulted in the conventional control system, when the spindle shaft is inclined by $\Delta\theta$ in both of the control system in accordance with the present invention and the conventional control system.

What is claimed is:

1. A head position controller for a disc storage unit comprising:
    a plurality of discs having a plurality of major disc surfaces, each of said plurality of major disc surfaces having tracks for recording information, said tracks being provided on each of said major disc surfaces of each of said plurality of discs, and each of said plurality of discs being rotatably mounted on a common shaft;
    a spindle motor for driving said discs to rotate;
    an index pulse generator which is mounted on said spindle motor, for producing an index pulse corresponding to a predetermined rotation angle of said spindle motor;
    a plurality of heads, each of which is disposed adjacent to a respective one of said major disc surfaces so that each of said plurality of read/write heads corresponds to a respective one of said major disc surfaces to read out/write the information from/into the corresponding said major surface;

a two-phase type stepping motor for displacing said plurality of heads in a radial direction relative to each of said discs, each of said plurality of heads being displaceable relative to respective track positions corresponding to positions of said tracks, as well as along respective reference positions corresponding to positions of servo information for detecting an off-track amount of said heads with respect to a center line of each of said tracks;

a stepping motor drive circuit for controlling each phase current of said two-phase type stepping motor;

a read/write circuit for reading out/writing said information into/from said major surface of a selected one of said plurality of discs by selection of a determined one of said plurality of heads in response to a head selection command;

servo information writing means for writing said servo information into each of said major surfaces of said plurality of discs, via said read/write circuit and said determined one of said plurality of heads in synchronism with said index pulse when said servo information is written, after said stepping motor has been driven to move to said reference position by means of said stepping motor drive circuit;

off-track detecting means for reading out said servo information on said major surface of said selected one of said plurality of discs in response to said index pulse by said read/write circuit, and detecting an off-track amount in accordance with the servo information read-out; and head position correcting means for outputting said head selection command to read out/write said information into/from said read/write circuit when said information from/to said track is read out, said head position correcting means then causing said stepping motor to be driven to move to a desired track position by means of said stepping motor drive circuit, whereupon said head position is corrected by said stepping motor drive circuit in accordance with said off-track amount detected by said off-track detection means.

* * * * *